March 15, 1966   O. MEYER   3,240,466
SHUTOFF VALVE
Filed April 2, 1963
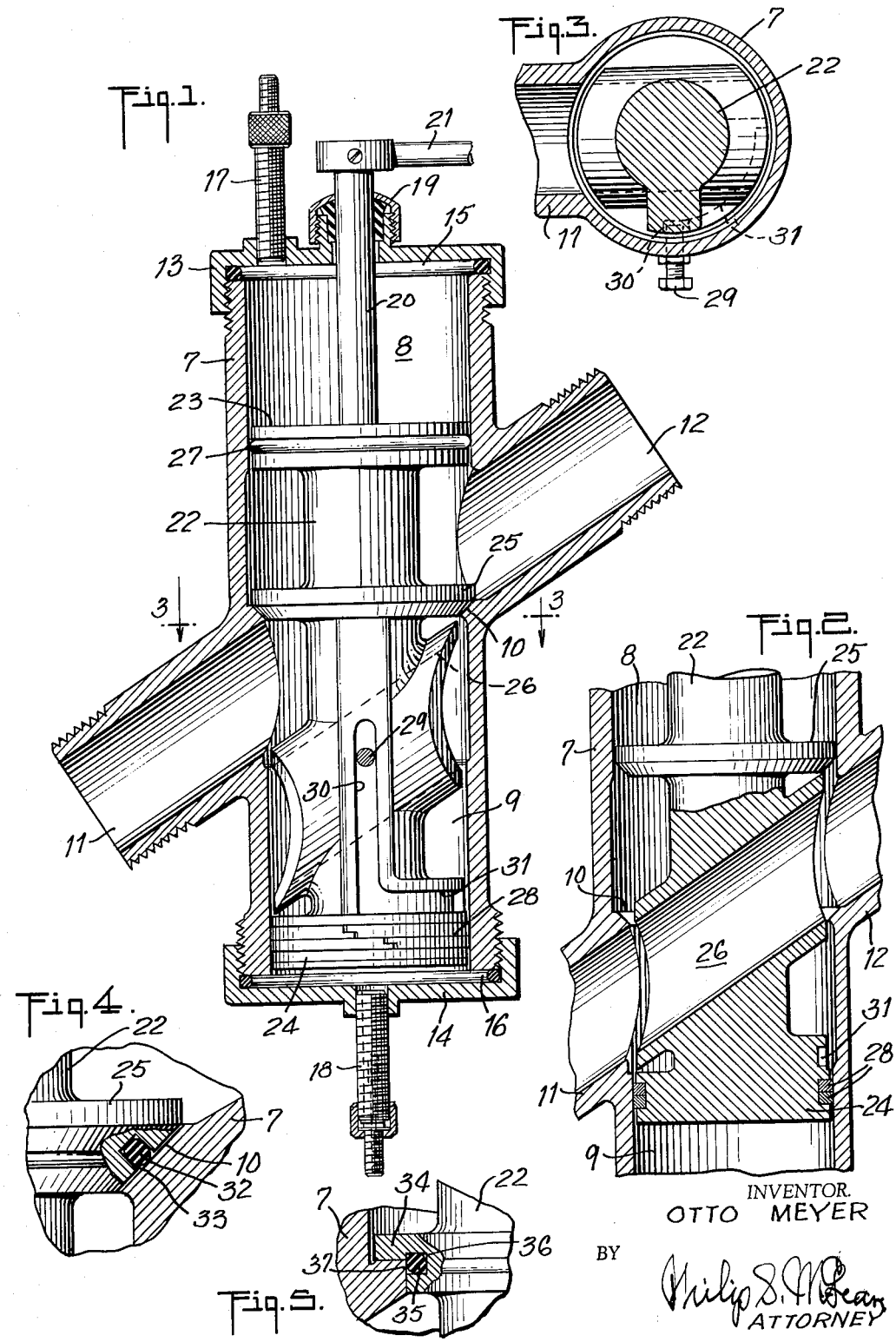
INVENTOR.
OTTO MEYER
BY
*Philip S. McBean*
ATTORNEY

United States Patent Office

3,240,466
Patented Mar. 15, 1966

3,240,466
SHUTOFF VALVE
Otto Meyer, Ehlershausen 69, Germany
Filed Apr. 2, 1963, Ser. No. 269,968
1 Claim. (Cl. 251—31)

The invention herein disclosed relates to valves in the nature of shutoff valves, but is not restricted to that particular type of operation, since it may incorporate features of flow control for pressure reduction or flow regulation.

Particular objects of the invention are to provide a valve of simple durable construction, consisting of the fewest possible number of parts, which will have the advantages of unrestricted, straight through, flow passages, which will pass flow in either direction, which will be substantially balanced by pressure so as to require but little effort to open or close, which will be effective for either high pressure or low pressure fluids and which may be operated when so desired by utilizing a small fraction of its own flow medium.

Further special objects of the invention are to so construct a valve of this type that the active parts of the same may be readily removed, inspected and replaced without taking the valve off the flow line.

A further important object of the invention is to so construct and arrange the valve that it may, if required, be used to reduce and control the flow without subjecting valve parts to erosion or undue wear.

Other desirable objects attained by the invention and the novel features of construction, combination and relation of parts through which the purposes of the invention are effected are set forth and will appear in the course of the following specification.

The drawing accompanying and forming part of the specification illustrates a practical commercial embodiment of the invention. Structure, however, may be modified and changed as regards the immediate illustration, all within the true intent and scope of the invention as hereinafter defined and claimed:

FIG. 1 in the drawing is a vertical sectional view of one of these new valves, showing the piston-like form of valve body in the closed position.

FIG. 2 is a broken sectional detail, showing the piston element in the valve open position.

FIG. 3 is a broken cross sectional detail on substantially the plane of line 3—3 of FIG. 1.

FIG. 4 is a broken sectional detail of a conical form of the valve element carrying a sealing ring in the active face of the same.

FIG. 5 is a similar view illustrating a flat shoulder form of valve element with incorporated sealing ring.

The housing or body portion of the valve is unique as consisting simply of one-piece cylindrical member 7 having cylindrical chambers 8, 9 in the opposite ends of the same, with a valve seat 10 intermediate the end chambers and aligned flow passages 11, 12 projecting on opposite sides on an axis inclined diagonally to the longitudinal axis of the housing.

The ends of this body member are shown closed by screw caps 13, 14 sealed to the housing by O-rings 15, 16 and carrying fittings 17, 18 for fluid connections for operating the valve.

The upper screw cap is shown as carrying a packing gland 19 for a stem 20 for turning the valve element through the medium of an operating handle or lever 21.

The valve element consists of a piston or plug 22 having a piston head 23 operating in the upper chamber 8, a piston head 24 operating in the lower chamber 9, and an intermediate valve head 25 cooperable with the valve seat 10.

It is to be noted that this valve seat crosses the straight through flow passage provided by the flow lines 11 and 12 at an angle so that in the closed position shown in FIG. 1 these flow lines will be completely shut off from each other.

The lower portion of the piston body below the valve member 25 and between that member and the lower piston head 24 is provided with a straight through port or passage 26 inclined to the same extent as the flow lines 11 and 12 and arranged to register therewith in the open position of the valve shown in FIG. 2.

The upper and lower piston heads 23 and 24 are effectively sealed in their operating chambers 8 and 9 as by means of O-rings, as shown at the top at 27, or by metallic piston rings, as shown at the bottom at 28, or by any combination of such rings, selected according to the fluids to which the valve is subjected.

In the illustration the valve is adapted to be operated by fluid pressure introduced and released through the fluid connections 17 and 18 in the end caps of the valve but it will be appreciated that the valve may be operated by other means, such as hydraulic, electrical or manual means.

An important feature is that the valve may be operated by a small fraction of the fluid which it handles, this as a result of the fact that pressure on the valve element is substantially or nearly balanced so that little effort is required to open or close the valve.

In FIG. 1, if fluid is introduced through flow connection 11, upward pressure against the valve head 25 will be opposed by downward pressure on the somewhat larger piston head 24. Relatively light pressure introduced through the lower fitting 18 will therefore lift the valve to the open position shown in FIG. 2 with the inclined fully open valve passage 26 in line with the inclined flow connections 11 and 12.

In this open position the flow pressure is applied upwardly against valve body 25 and since this need not have a close fit in the cylinder, against the upper piston head 23.

This upward pressure is counterbalanced or opposed by downward flow pressure on the lower piston head 24 so that but light pressure, such as could be supplied by a fraction taken off the flow pressure at 17, acting on the upper piston head 23, will force the valve body down to the closed position, FIG. 1.

If the flow medium is introduced through the upper connection 12, FIG. 1, this pressure acting equally upwardly on the upper piston head 23 and downwardly on the valve head 25 will tend to hold the valve closed but this may be overcome by relatively light pressure introduced at 18 against the lower piston head 24.

In the open position, FIG. 2, the flow pressure introduced at 12 will have access to the upper face of the lower piston head 24 and to the lower face of the upper piston head 23, thus tending to balance and hold the valve element capable of being closed by relatively light downward pressure on the upper piston head.

Only the opposite ends of the piston valve need to be sealed in the valve casing. The intermediate portion of this valve element may be left free of the casing, providing passage for flow of the equalizing pressure.

By turning the valve member in the open position the flow may be restricted for pressure reducing or other purposes. The handle 21 may be utilized for this effect.

FIGS. 1 and 3 show how the valve element is held to a straight up and down opening and closing movement by screw pin 29 on the housing entering a straight up and down groove 30 in the side of the valve member, this groove being continued at an angle at the lower end, as at 31, permitting the valve to turn at the upper end of its full opening, thus to cut down the extent of free passage between the flow lines 11 and 12.

The longitudinally extending portion 30 of the groove insures the alignment of the inclined through passage in the valve with the flow passages in the valve casing and the transversely angled portion 31 of this groove in addition to permitting turning of the valve element at the end of its opening movement also serves to hold and lock the valve element in any position to which it may be turned for adjusting flow.

FIG. 4 shows how the transverse valve head 25 may have an O-ring or similar seal 32 mounted in a groove 33 in the conical face of the same to assist or insure complete, positive closing of the valve.

Substantially the same effect may be accomplished by a valve construction of the flat shoulder or cylindrical type illustrated at 34, FIG. 5, having an O-ring 35 mounted in an annular groove 36 in the side wall of the same to engage the opposing cylindrical wall of the valve seat 37.

In both forms the O-ring seals are held in grooves protecting them against erosion from the flow medium.

The valve is of simple construction and can be produced at low cost. No expensive controls or operating devices are required. If desired the valve may be operated by taking off a small fraction of the pressure fluid which it controls. It may be operated by pressure, for instance in the opening direction, and closed by spring force, thus to serve in a fail-safe capacity. Manual operation may be effected by means of the stem 20 connected with the upper end of the valve piston.

This piston may be made in two parts, entered in opposite ends of the housing and joined together by screw or other connecting means. This construction enables quick and easy inspection, removal, and replacement of the piston and this can be effected without disconnecting the valve from the flow line.

The inclined straight through full diameter flow passage through the valve piston, lining up with the diagonally extending flow connections provides maximum flow capacity in a compact small unit and the balancing pressures acting on this piston enables this large flow volume to be readily controlled with either high or low pressure fluids.

The fluid medium transmitted by the valve may be utilized to actuate the valve by extending connections from the end fiittings 17, 18 to the pressure side of the valve with suitable controls in those connections.

The diagonal inclination of the flow through connections 11, 12 locates the terminations of these passages at opposite sides of the transverse valve seat, providing positive shutoff control free of close fitting sliding connection.

The piston heads operating in piston chambers in opposite ends of the housing, seal off the valve mechanism between the same and provide means for exerting a balancing effect and means for effecting operation of the valve.

The exposure of valve parts to oppositely acting pressure renders the valve sensitive to slightly overbalancing force or pressure for effecting actuation of the valve. The clearances provided at opposite sides of the intermediate valve head provide flow for keeping the valve free of objectionable deposits.

The action of the valve is quick and positive and this freedom of action enables it to operate if desired without lubrication or other attention.

What is claimed is:

A valve comprising
a cylindrical body member having cylindrical chambers in opposite ends of the same, a transversely disposed valve seat between said end chambers and axially aligned inclined flow connections open respectively to opposite sides of said valve seat,
a reciprocating valve element having piston heads at opposite ends of the same operating in said cylindrical chambers and a transversely disposed valve head between said piston heads cooperable with said valve seat,
said valve element having a flow passage extending therethrough on an incline corresponding to the inclined axis of said flow connections,
means for holding said valve element to movement with said inclined through passage in register with said flow connections, and
means including said piston heads for imparting longitudinal valve opening and closing movements to said valve element, said means for holding the valve element with the inclined through passage in register with the flow connections including a longitudinal groove in the valve element terminating in a circumferentially formed extension of the groove about the periphery of the valve member for approximately 90 degrees, and a guide pin on the body member entered in said groove.

References Cited by the Examiner

UNITED STATES PATENTS

| 746,337 | 12/1903 | Junggren | 251—31 X |
| 1,345,518 | 7/1920 | Van Brunt | 251—229 |
| 2,538,133 | 1/1951 | Tratzik | 251—333 X |
| 2,708,452 | 5/1955 | Tappan | 251—325 X |
| 2,923,310 | 2/1960 | Eckert | 251—31 X |

FOREIGN PATENTS 687,637  2/1953  Great Britain.

ISADOR WEIL, *Primary Examiner.*

D. LAMBERT, *Assistant Examiner.*